US008465705B2

(12) United States Patent
Ciccarelli et al.

(10) Patent No.: US 8,465,705 B2
(45) Date of Patent: Jun. 18, 2013

(54) PROCESS FOR THE REDUCTION/REMOVAL OF THE CONCENTRATION OF HYDROGEN SULFIDE CONTAINED IN NATURAL GAS

(75) Inventors: Liberato Giampaolo Ciccarelli, San Giuliano Milanese-Milan (IT); Gian Paolo Borghi, Piacenza (IT)

(73) Assignee: ENI S.p.A., Rome (IT)

( * ) Notice: Subject to any disclaimer, the term of this patent is extended or adjusted under 35 U.S.C. 154(b) by 1484 days.

(21) Appl. No.: 11/629,513

(22) PCT Filed: Jun. 15, 2005

(86) PCT No.: PCT/EP2005/006552
§ 371 (c)(1), (2), (4) Date: Dec. 14, 2006

(87) PCT Pub. No.: WO2006/002781
PCT Pub. Date: Jan. 12, 2006

(65) Prior Publication Data
US 2008/0031792 A1   Feb. 7, 2008

(30) Foreign Application Priority Data
Jun. 25, 2004   (IT) .......................... MI2004A001288

(51) Int. Cl.
*B01J 19/00* (2006.01)
*C07C 9/00* (2006.01)

(52) U.S. Cl.
USPC .............................. 422/198; 422/232; 585/15

(58) Field of Classification Search
USPC ..... 95/153, 235; 423/220, 225, 563; 422/198, 422/232; 585/15
See application file for complete search history.

(56) References Cited

U.S. PATENT DOCUMENTS

| 2,225,959 | A | * | 12/1940 | Miller | 95/13 |
|---|---|---|---|---|---|
| 3,058,832 | A | * | 10/1962 | Glew | 210/711 |
| 3,360,946 | A | * | 1/1968 | Di Napoli | 62/621 |
| 5,340,382 | A | * | 8/1994 | Beard | 95/151 |
| 5,434,330 | A | * | 7/1995 | Hnatow et al. | 585/864 |
| 6,245,955 | B1 | * | 6/2001 | Smith | 585/15 |
| 7,004,996 | B2 | | 2/2006 | Ciccarelli | |

FOREIGN PATENT DOCUMENTS

| GB | 263 830 | 11/1927 |
|---|---|---|
| GB | 568 292 | 3/1945 |
| GB | 568292 | * 3/1945 |

* cited by examiner

*Primary Examiner* — Robert A Hopkins
(74) *Attorney, Agent, or Firm* — Oblon, Spivak, McClelland, Maier & Neustadt, L.L.P.

(57) ABSTRACT

Process for the removal/reduction of the hydrogen sulfide contained in natural gas which comprises: a) feeding natural gas and water to a reaction vessel maintained under thermodynamic conditions favorable for the formation of $H_2S$ hydrates and substantially at the production pressure of natural gas; b) discharging the $H_2S$ hydrates, from the bottom of the reaction vessel; c) optionally melting the hydrates and re-injecting water and/or gas comprising hydrogen sulfide and/or the hydrates as such into the same production field or into a geologically equivalent structure; and d) optionally feeding the remaining natural gas to a conventional softening process.

10 Claims, No Drawings

PROCESS FOR THE REDUCTION/REMOVAL OF THE CONCENTRATION OF HYDROGEN SULFIDE CONTAINED IN NATURAL GAS

The present invention relates to a process for the reduction/removal of the concentration of hydrogen sulfide contained in natural gas.

More specifically, the present invention relates to a process for the reduction of the hydrogen sulfide content in natural gas or in associated gas (to the oil field) at such concentrations as to make its downstream treatment in a traditional softening process, convenient.

As it is known, natural gas and also associated gas (hereafter both referred to as natural gas) have become a thermal energy source which forms one of the main alternatives to traditional fuels of a fossil nature, in particular coal and fuel oils of an oil origin, compared to which it is less polluting and gives a greater energy yield per unit of $CO_2$ generated.

Natural gas, coming from production fields, essentially consists of methane but can also contain, in addition to significant traces of higher $C_2$-$C_{7+}$ hydrocarbons, varying quantities of inert or polluting gases, for example carbon dioxide, or $H_2S$, whose presence must be eliminated or reduced to satisfy the specifications of use.

These specifications include that of respecting the Wobbe index, a parameter defined by the ratio between the thermal value (upper and lower) of the gas and its density with respect to the air and also of having a practically zero content of $H_2S$.

Methods for the removal of inert or polluting gases, in particular nitrogen or hydrogen sulfide, from natural gas, are known in scientific literature. Most of these processes, however, are essentially based on cryogenic removal, as in the case of nitrogen, or on removal by absorption with alkylamines, as in the case of hydrogen sulfide, with results which are generally effective but not always economical. In particular, there are natural gas reservoirs in which the concentration of hydrogen sulfide is so high as to make their exploitation inconvenient from and economical point of view due to the high separation costs and subsequent treatment of the pollutant ($H_2S$). Particularly important is the hydrogen sulfide treatment phase, which, after separation, is transformed to elemental sulfur by means of the known Claus process, with consequent problems relating to disposal. One of these disposal methods, described in U.S. Pat. No. 6,582,025, envisages storage of the sulfur, in the molten state or in an aqueous dispersion, inside underground cavities.

Methods for purifying natural gas containing pollutants, alternative to the traditional ones and which envisage the formation of gas hydrates, have been recently proposed in literature.

The term "gas hydrates" as used in the present description and claims refers to solid structures which are formed by combining a gas with water. Gas hydrates form a group of solids in which molecules having relatively small dimensions occupy substantially spherical cavities in latticed structures analogous to ice consisting of water molecules linked by hydrogen bridges. In particular, gas hydrates are structural combinations of molecules which remain associated not through attractive strong chemical forces but as a result of the mutual binding effect of the water molecules which enables the formation of cage-type structures which firmly englobe the individual gas molecules.

U.S. Pat. No. 5,434,330 describes a method for purifying natural gas from its traditional pollutants, such as nitrogen, carbon dioxide and hydrogen sulfide, by the formation of hydrates, with aqueous solutions of methanol. According to the method of the known art, the methane contained in natural gas forms a hydrate with said solutions, separating itself from the pollutants, and is then recovered, in a melting device, by simple heating and is substantially ready for distribution. In this patent, however, there are no indications as to how to process the pollutant separated from the natural gas and, in particular, there are no practical examples which illustrate the treatment of the gas when the pollutant is essentially hydrogen sulfide.

The Applicant has now found an alternative method for the purification of the methane contained in natural gas which, contrary to the known art, envisages the formation of hydrates with the polluting element. In particular, in the case of natural gas essentially consisting of methane and hydrogen sulfide, the latter can be significantly separated in a simple and inexpensive way in the form of hydrates and subsequently, after liquefaction, it can be reintroduced into the gas production field, or into equivalent geological structures, for example in the form of a mixture with water. The remaining natural gas is either practically purified or contains reduced quantities of $H_2S$ and can therefore be treated with a subsequent softening process which is economically convenient.

An object of the present invention therefore relates to a process for the removal/reduction of hydrogen sulfide contained in natural gas which comprises:

a) feeding natural gas, containing water, preferably vaporized, in a quantity ranging from 40 to 80% by weight, calculated with respect to the total, to a reaction vessel maintained under thermodynamic conditions favourable for the formation of $H_2S$ hydrates and substantially at the production pressure of natural gas;

b) discharging the $H_2S$ hydrates from the bottom of the reaction vessel;

c) optionally melting the hydrates and re-injecting water and/or gas comprising hydrogen sulfide and/or hydrates as such into the same production field or into a geologically equivalent structure; and d) optionally feeding the remaining natural gas to a conventional softening process to reach the delivery specifications.

According to the present invention, it is preferable to operate with a natural gas essentially consisting of methane and hydrogen sulfide in which other components, of both a hydrocarbon nature, such as, for example, ethane or propane, or of a different nature, such as nitrogen or carbon dioxide, are present in such concentrations as to not influence the Wobbe index. In this way, the natural gas purified according to the method of the present invention can be ready for direct feeding into the network and consequently for distribution.

The natural gas is generally obtained from wells in which the gas pressure can be extremely high, for example over 10 MPa. As the most favourable thermodynamic conditions for the formation of $H_2S$ hydrates envisage a temperature ranging from 15 to 25° C. and a pressure ranging from 5 to 15 MPa, in the case of high pressure wells (higher than 10 MPa) the natural gas can be brought to thermodynamic conditions favourable for the formation of hydrates by means of its expansion, preferably in a turbine with energy recovery. In the case of low pressure wells, for example lower than 5 MPa, it is preferable to act on the temperature, adapting this to the pressure, by reducing it to below 15° C.

After the formation of the hydrates, collected on the bottom of the reaction vessel, these can be recovered either in continuous or batchwise. Upon heating, for their liquefaction, a mixture is obtained, comprising $H_2S$, in the gaseous state, and water containing partially dissolved $H_2S$. After the possible separation of the two phases, these are injected into the subsoil or, alternatively, only the hydrogen sulfide is injected into the subsoil, whereas the water is recycled to the hydration reactor.

According to an alternative embodiment of the removal/reduction process of the hydrogen sulfide contained in natural gas, object of the present invention, the hydrates deposited on the bottom of the reactor are collected in continuous and are re-injected into the subsoil, as such, for example as an aqueous slurry.

The geological structures which are destined for receiving gaseous hydrogen sulfide and/or an aqueous solution thereof and/or the hydrates as such, are preferably those consisting of the field from which the natural gas, which is subsequently treated with the process, object of the present invention, is removed. Alternatively, it is possible to use geological structures in a remote position with respect to the field, having suitable structural characteristics for receiving and preserving both the gaseous hydrogen sulfide and/or its aqueous solution and/or the hydrates as such.

For the application of the present invention, both geological structures with a matrix and either naturally or induced fractured structures, can be used. In all cases, the pressure and maximum injection flow-rate of the two components, consisting of gaseous hydrogen sulfide and the aqueous solution, can be determined by means of calculations and measurements well known to experts in effecting the stimulation treatment of natural gas producing and/or oil and associated gas wells or in the formation and running of water and/or gas re-injection wells.

In order to guarantee continuity to the process for the removal of hydrogen sulfide contained in natural gas, object of the present invention, it is preferably to operate with at least two reaction vessels connected in parallel with respect to the gas flow. In this way, when one of the reactors is possibly stopped for discharging the accumulated hydrates, the other is active with the formation of hydrates. Alternatively, it is possible to operate in continuous by feeding gas and water to a vertical reactor and collecting the solid phase on the bottom which is continuously discharged, for example by means of a worm screw.

An experimental test is provided below for illustrative but non-limiting purposes.

Natural gas is adopted, available at 2 MPa, having the following composition:

|  | % moles |
|---|---|
| $C_1$ | 80.0 |
| $C_{2+}$ | 4.3 |
| $H_2S$ | 15.0 |
| others | 0.7 |

8,000 $Nm^3/d$ of this gaseous stream are fed to a closed vessel maintained at 2 MPa and at a temperature of 1° C., together with 15 t/d of finely vaporized water. 4,900 $Nm^3/d$ of gas containing 2.1% moles of $H_2S$ and 18.4 t/d of hydrates are formed from the contact between the vaporized water and the gas.

After separating the gas, the hydrates were depressurized producing a mixture of slightly acidic water and gas containing 1.56 t/d of $H_2S$ (91% of the hydrogen sulfide charged).

The invention claimed is:

1. A process for removing hydrogen sulfide from natural gas, comprising:
    feeding pressurized natural gas to a reaction vessel;
    treating the natural gas at a temperature of from 15 to 25° C. at a pressure of from 5 to 15 MPa to form a solid $H_2S$ hydrate, wherein the natural gas comprises water in an amount of 40-80% by weight based on the total weight of the natural gas;
    separating the solid $H_2S$ hydrates from the reaction vessel; and
    at least one of (i) injecting the $H_2S$ hydrates into a geologic formation and (ii) liquefying the solid $H_2S$ hydrates,
    wherein the natural gas remains gaseous during the feeding, treating and separating.

2. The process according to claim 1, which comprises liquefying the solid $H_2S$ hydrates to form a mixture comprising gaseous $H_2S$ and an aqueous composition comprising $H_2S$.

3. The process according to claim 1, wherein the solid $H_2S$ hydrates are separated from the natural gas at the bottom of the reaction vessel.

4. The process according to claim 1, wherein the natural gas is treated by expansion in a turbine.

5. The process according to claim 1, wherein the natural gas consists essentially of methane, hydrogen sulfide and water.

6. The process according to claim 1, consisting of the feeding, treating and separating.

7. A process for the removal of hydrogen sulfide from natural gas, comprising:
    feeding a natural gas stream and a water stream to a reaction vessel to form a gaseous composition consisting of the natural gas and the water in the reaction vessel;
    treating the gaseous composition inside the reaction vessel at a temperature of from 15 to 25° C. at a pressure of from 5 to 15 MPa to form a solid $H_2S$ hydrate, wherein the gaseous composition comprises water in an amount of 40-80% by weight based on the total weight of the composition;
    separating the solid $H_2S$ hydrates from the reaction vessel; and
    at least one of (i) injecting the $H_2S$ hydrates into a geologic formation and (ii) liquefying the solid $H_2S$ hydrates,
    wherein the natural gas remains gaseous during the feeding and the treating.

8. The process according to claim 7, wherein the natural gas is treated by expansion in a turbine.

9. The process according to claim 7, wherein the natural gas consists essentially of methane, hydrogen sulfide and water.

10. The process of claim 7, consisting of the feeding, treating and separating.

* * * * *